United States Patent [19]

Moren

[11] Patent Number: 4,852,297

[45] Date of Patent: Aug. 1, 1989

[54] METHOD AND ARTICLE OF MANUFACTURE FOR PRODUCING MUSHROOMS FROM SELF CONTAINED VESSELS

[76] Inventor: Douglas L. Moren, 6264 N. Hunter Rd., Livingston, Calif. 95334

[21] Appl. No.: 65,402

[22] Filed: Jun. 23, 1987

[51] Int. Cl.$^4$ .............................................. A01G 1/04
[52] U.S. Cl. ..................................................... 47/1.1
[58] Field of Search .......................... 47/1.1, 58, 81, 82

[56] References Cited

U.S. PATENT DOCUMENTS

| | | | |
|---|---|---|---|
| 1,914,353 | 6/1933 | Rettew | 47/1.1 |
| 2,072,172 | 3/1937 | Lockyer | 47/81 |
| 3,242,614 | 3/1966 | Thompson | 47/1.1 |
| 3,865,695 | 2/1975 | Massier | 47/1.1 |
| 4,027,427 | 6/1977 | Stoller | 47/1.1 |
| 4,127,965 | 12/1978 | Mee | 47/1.1 |
| 4,287,682 | 9/1981 | Browne | 47/81 |
| 4,313,278 | 2/1982 | Pointing | 47/1.1 |

FOREIGN PATENT DOCUMENTS

| | | | |
|---|---|---|---|
| 85928 | 8/1983 | European Pat. Off. | 47/1.1 |
| 25682 | 7/1971 | Japan | 47/1.1 |

Primary Examiner—Danton D. DeMille
Attorney, Agent, or Firm—Alfred A. Equitz

[57] ABSTRACT

A method and system for growing tree mushrooms indoors, from within self contained vessels. An enclosed cylindrical container houses a colony of mushroom mycelium and rehydrated nutritive substrate. Said container is surrounded by cloth/fabric with water absorbent properties. When holes are made through the fabric and container the mycelium colony is stimulated to produce mushrooms. The apparatus is then partially submerged in a shallow reservoir of water. Moisture absorbed from the fabric then supplies the mushrooms with required moisture for development. The method consists of filling the container with a substrate (such as whole grain), adding an appropriate volume of water through a hole in the container, and covering the hole with an adhesive membrane, then sterilizing the container and contents. After cooling, appropriate fungus is inoculated to the substrate and is incubated at a required temperature for an appropriate time period. Water absorbent fabric is then attached to the external circumference of the container.

18 Claims, 1 Drawing Sheet

METHOD AND ARTICLE OF MANUFACTURE FOR PRODUCING MUSHROOMS FROM SELF CONTAINED VESSELS

FIELD OF INVENTION

This invention relates to mushroom production and specifically to an improved way of growing edible, ornamental mushrooms in the living and working environment.

DISCUSSION OF PRIOR ART

Heretofore home mushroom kits required an enclosed environment such as a terrarium or covering of transparent or translucent materials. The purpose of this enclosure is to regulate the moisture content of the mushroom growing surface and to increase the humidity of the air space surrounding the developing mushrooms. This requirement limits the use of a mushroom kit, especially as a decorative ornament because: (1) condensation accumulates on the inside of these physical barriers and encumbers the view of developing mushrooms; and (2) the terrarium cover is bulky, thus limiting the areas in which the kit can be fruited. Although a high quality terrarium is visually appealing, it adds an enormous expense to the mushroom kit and therefore narrows its potential market scope. Inversely, an inexpensive terrarium has a narrow market scope because of visual incompatability with the home or work interior design.

The bulkiness and unsightliness of the mushroom substrate is another factor that limits the decorative potential of hobby type mushroom kits.

Generally, these kits employ Leatinus edodes and Agaricus species which require lengthy periods of attention for fruiting body development (14–40 days). This increases the potential of failure due to contamination and/or neglect. Moreover, the temperature at which these conventional species fruit is inconsistent with the general temperature range of the human indoor environment. Agaricus spp. must be grown in a dark place.

Accordingly, several objects of my invention are to provide an inexpensive growing kit of edible tree mushrooms that has a broad application as decor in the work and home environment; and an efficient process where the container used for cultivation of the mushroom mycelium is converted into an apparatus used for mushroom production. The fabric/cloth surrounding the mushroom substrate container provides several improvements over other mushroom kits. It increases the visibility of the developing mushrooms by eliminating the need for use of terrariums or enclosures for creating moist fruiting conditions. It also provides moisture on a continuous basis for the developing mushrooms. The cloth/fabric also serves to conceal the container and substrate and render it appealing to the eye.

The aluminum vessel containing the mushroom substrate also provides advantages over prior art. The location from which the mushroom grows can be selected by simply making holes through the container where desired. The container and fabric insure a strong fruiting response by creating physiological and environmental conditions that closely resemble conditions for tree mushrooms in the wild. The size and shape of this container also encourages placement in the home and work environment, e.g., coffee tables, window sills, and desk tops.

Another distinct advantage of this invention is in processing. The container first serves as an aseptic vessel to culture the vegetative phase of the mushroom, and later, with only slight modification, becomes a device to control and facilitate the fruiting phase of the mushroom.

The mushroom species selected for this kit, Pleurotus ostreatus, also provides advantages over prior art. It has a rapid fruiting body development time of 5–10 days and its fruiting body response is consistent with the general light and temperature ranges of indoors environment.

Further objects and advantages of my invention will become apparent from a consideration of the drawings and ensuing description thereof.

DRAWINGS

FIG. 1 is a side view of the invention.
FIG. 2 is a top view of the invention.

DETAILED DESCRIPTION OF THE PREFERRED EMBODIMENTS

Figure 1:
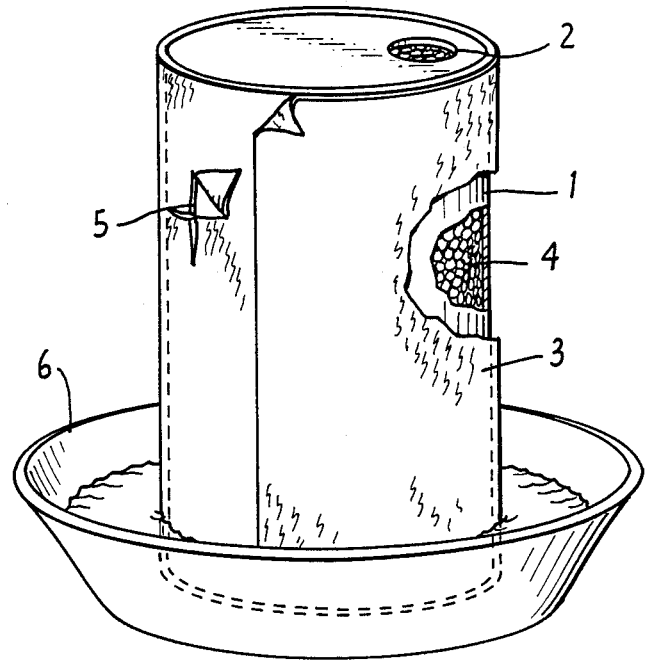
Figure 2:
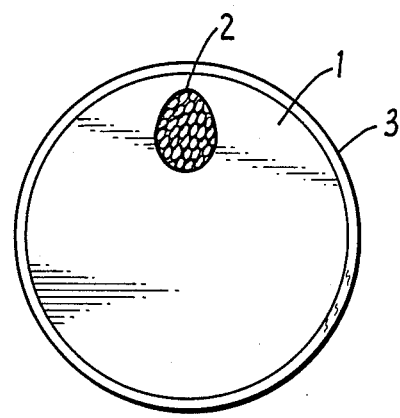

Number 1 of FIG. 1 and 2 is an aluminum container housing the mushroom substrate. Its dimensions and design are in general the same as an aluminum beverage can (12 oz.). In all embodiments, Container 1 is heat tolerant. Preferably, container 1 is rigid, and is made of metal (such as aluminum) or heat tolerant plastic. Number 2 of FIG. 1 and 2 is the hole at the top of container.

Number 3 of FIG. 1 and 2 is a cloth/fabric that surrounds and is fastened to said container. Cloth/fabric 3 is composed of cotton, polyester, or mixtures of these.

Number 4 if FIG. 1 is a mushroom substrate composed of sterilized cellulosic materials. Another component of substrate is the colonized mycelium of the tree mushroom.

Number 5 of FIG. 1 are holes through cloth/fabric 3 and container 1.

Number 6 of FIG. 1 is a shallow dish containing a reservoir of water.

Water is added to rehydrate substrate 4 (preferably at a substrate-to-water volume ratio of 1:1) at the time substrate 4 is loaded within container 1. The purpose of the rehydrated substrate (which may be a rehydrated grain substrate is to provide a nutrient and water supply for the mycelium as it grows vegetatively and as it produces mushrooms. The function of the mycelium colony is to enter a sexual phase, in which it produces one or more mushrooms (also referred to herein as "fruiting bodies.")

The function of container 1 is to house the mycelium and rehydrated substrate. It provides the dark and enclosed conditions required to promote and maintain mycelium in the vegetative state. Its cylindrical design provides a vertical surface natural for fruiting body development. The hole at the top of the container serves as port of entry for substrate, water, and mycelium inoculum.

The covering (which may be a heat-tolerant adhesive tape membrane) over top hole is used to close and seal container after filling with substrate and water before sterilization. The top hole covering preferably also serves as penetrable membrane for liquid inoculation after sterilization, and also isolates the mycelium colony (in its vegetative phase) from fruiting stimuli (e.g., oxygen and light) and contaminating organisms after sterilization. After container 1 is filled, the top hole is sealed, and the container (with its contents) is sterilized in an autoclave, preferably at 15 p.s.i. for about one hour. After the sterilized substrate has cooled, it is inoculated with a live tree mushroom mycelium culture, and then incubated within the temperature range from 75 to 90 degrees Fahrenheit until the mycelium has colonized the substrate.

The holes 5 through the sidewall of container 1 are created by the user of the inventive product for the purpose of initiating the mushroom fruiting response. When holes 5 are made through the container and fabric, the mycelium becomes exposed to light and oxygen and begins the process of fructification (i.e., begins the sexual phase of the mushroom's life cycle). The mushrooms then grow through the holes 5 and develop on the outside of container. Holes 5 may be created by puncturing container 1 and fabric 3 when desired after inoculation of the sterilized substrate and incubation of the mycelium colony, or they may be preexisting holes. In the latter case, holes 5 may be uncovered (or "unveiled") when desired to initiate fructification.

The operation of said fabric is to provide water for the developing mushroom. It does this by translocating water from the reservoir to the mushrooms by capillary action. The operation of the water reservoir is to provide a continuous supply of water for the developing mushrooms. The combined function of fabric, container and water reservoir is to create a specific microclimate conducive to the cultivation of one or more mushrooms, after holes 5 are opened.

While the above description contains many specificities, these should not be construed as limitations on the scope of the invention, but rather as an exemplification of one preferred embodiment thereof. Many other variations are possible, for example, the size and shape of the substrate container can vary greatly. Container 1 should be heat-tolerant (for example, it may be made of metal or heat-tolerant plastic), and it should hide substrate 4 and provide openings for mushrooms to emerge from within the container. The openings in the container may be produced by either puncturing the container or by uncovering preexisting holes in the container.

The fabric used to surround the container is not limited to cotton, polyester or mixtures thereof. Any fabric that has the ability to translocate moisture will work. The substrate is not limited to the above-mentioned grains. Any substrate that provides the required nutrients and physical structure for mycelium colonization will be sufficient. For example, dry corn, wheat, oats, saw dust, cotton seed hulls, chopped straw, milo, compost, chopped corn cob, or other cellulose material will suffice.

The mushroom species *Pleurotus ostreatus,* subspecies floridia and Sajor caju is preferred for its rapid fruiting time and its fruiting compatibility with room temperature and lighting. However cultivars of other species may be used such as *Lentinus edodes,* Agaricus spp. Volvariella spp. can also be used. Alternatively, the mushroom species *Flammulina velutipes* or *Auricularia polytrica* may be used. The invention is not limited for use as a home mushroom growing device. Another application of the inventive mushroom kit is as an educational science kit.

While the above description contains many specificities, these should not be construed as limitations on the scope of the invention, but rather as an exemplification of one preferred embodiment thereof. Many other variations are possible, for example, the size and shape of the substrate container can vary greatly. Container 1 should be heat-tolerant (for example, it may be made of metal or heat-tolerant plastic), and it should hide substrate 4 and provide openings for mushrooms to emerge from within the container. The openings in the container may be produced by either puncturing the container or by uncovering preexisting holes in the container.

The fabric used to surround the container is not limited to cotton, polyester or mixtures thereof. Any fabric that has the ability to translocate moisture will work. The substrate is not limited to the above-mentioned grains. Any substrate that provides the required nutrients and physical structure for mycelium colonization will be sufficient. For example, dry corn, wheat, oats, saw dust, cotton seed hulls, chopped straw, milo, compost, chopped corn cob, or other cellulose material will suffice.

The mushroom species Pleurotus ostreatus, subspecies floridia and Sajor caju is preferred for its rapid fruiting time and its fruiting compatibility with room temperature and lighting. However cultivars of other species may be used such as Lentinus edodes, Agaricus spp. Volvariella spp. can also be used. Alternatively, the mushroom species Flammulina velutipes or Auricularia polytrica may be used. The invention is not limited for use as a home mushroom growing device. Another application of the inventive mushroom kit is as an educational science kit.

What is claimed is:

1. An apparatus
for growing mushrooms , including: a nutritive substrate, colonized by mushroom mycelium ; an enclosed container having a top surface, and housing said substrate and said mushroom mycelium ; a fabric surrounding said container, said fabric being capable of absorbing and translocating water ; and a reservoir of water partially submerging the fabric for keeping said fabric wet, so that the fabric will translocate water from the reservoir to a target region of the fabric in order to provide moisture to the target region, and wherein a hole extends through the container and the fabric at the target region, so that water translocated from the reservoir to the target region will contribute to a microclimate conducive to cultivation of a mushroom at the hole.

2. The apparatus of claim 1, wherein the substrate is a grain substrate that has been rehydrated and sterilized.

3. The apparatus of claim 1, also including a live culture of tree mushroom mycelium growing throughout the substrate.

4. The apparatus of claim 1, wherein the container is a cylindrical metal container.

5. The apparatus of claim 1, wherein a sealable entry port extends through the top surface of the container, for introducing the substrate, a mushroom inoculum, and water into the container.

6. A method for producing mushrooms, including the steps of:
   (a) sterilizing a rehydrated nutritive substrate within a sealed, heat-tolerant container;
   (b) after step (a), inoculating the sterilized substrate with a mushroom mycelium inoculum;

(c) after step (b), incubating the inoculum within the sealed container, so that the inoculum establishes a colony within the sealed container, said colony including a mushroom mycelium in the vegetative phase of its life cycle;

(d) attaching fabric around the container; and (e) modifying the sealed container and fabric to initiate the sexual phase of the life cycle of the mushroom mycelium and stimulate the mushroom mycelium to produce a mushroom.

7. The method of claim 6, wherein step (e) includes the operation of causing a hole to extend through the sealed container and the fabric.

8. The method of claim 6, wherein the container has an entry port, and wherein the rehydrated nutritive substrate is a mixture of substantially equal volumes of water and cellulosic substrate, and also including the step of:

introducing the rehydrated nutritive substrate into the container, and then sealing the entry port with a heat tolerant adhesive membrane.

9. The method of claim 6, wherein the rehydrated nutritive substrate includes a cellulosic grain material.

10. A method for producing mushrooms, including the steps of:

(a) sterilizing a nutritive substrate within a sealed, heat-tolerant container;

(b) after step (a), inoculating the sterilized substrate with a mushroom mycelium inoculum;

(c) after step (b), incubating the inoculum within the sealed container, so that the inoculum establishes a colony within the sealed container, said colony including a mushroom mycelium in the vegetative phase of its life cycle;

(d) attaching fabric around the container; and (e) opening a hole through the container and the fabric to allow oxygen and light to reach the colony, to initiate the sexual phase of the life cycle of the mushroom mycelium and stimulate the mushroom mycelium to produce a mushroom at the hole.

11. The method of claim 10, wherein step (a) includes the operations of placing substantially equal volumes of dry corn and water into the container, sealing the container, and then sterilizing the container, dry corn, and water in an autoclave at a pressure substantially equal to 15 p.s.i. for a time period substantially equal to an hour.

12. The method of claim 10, wherein steps (b) and (c) include the operations of inoculating the sterilized substrate with a live tree mushroom culture, and incubating the live tree mushroom culture within the temperature range from 75 to 90 degrees Fahrenheit until the live tree mushroom culture has colonized the substrate.

13. The method of claim 10, wherein the live tree mushroom culture is of the species Pleurotus ostreatus.

14. The method of claim 10, wherein the live tree mushroom culture is of the species Lentinus edodes.

15. The method of claim 10, wherein the live tree mushroom culture is of the species Flammulina velutipes.

16. The method of claim 10, wherein the live tree mushroom culture is of the species Auricularia polytrica.

17. The method of claim 10, wherein the container is a cylindrical metal container, and wherein the fabric is attached to the metal container's external circumference in step (d).

18. The method of claim 10, also including the step of:

(f) partially submerging the fabric in a water reservoir, so that the fabric will translocate water from the reservoir to the mushroom.

* * * * *